(12) United States Patent
Bullock

(10) Patent No.: US 12,347,240 B2
(45) Date of Patent: Jul. 1, 2025

(54) METHOD AND SYSTEM FOR USING DATA PACKET BEACONING TO DETERMINE COMPLIANCE WITH PROTOCOLS

(71) Applicant: GOJO Industries, Inc., Akron, OH (US)

(72) Inventor: Mark Adam Bullock, Wooster, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 17/878,711

(22) Filed: Aug. 1, 2022

(65) Prior Publication Data

US 2022/0366729 A1 Nov. 17, 2022

Related U.S. Application Data

(63) Continuation of application No. 16/581,585, filed on Sep. 24, 2019, now Pat. No. 11,403,888.

(60) Provisional application No. 62/735,435, filed on Sep. 24, 2018.

(51) Int. Cl.
*G07C 1/02* (2006.01)
*H04L 67/50* (2022.01)

(52) U.S. Cl.
CPC .............. *G07C 1/02* (2013.01); *H04L 67/535* (2022.05)

(58) Field of Classification Search
CPC ................................ G07C 1/02; H04L 67/535
USPC .................................................... 340/309.16
See application file for complete search history.

(56) References Cited

U.S. PATENT DOCUMENTS

| | | | | |
|---|---|---|---|---|
| 6,055,434 | A * | 4/2000 | Seraj | G01S 5/0045 455/456.2 |
| 8,325,621 | B2 * | 12/2012 | Simonsson | H04B 17/345 370/252 |
| 9,137,613 | B2 * | 9/2015 | El-Hoiydi | H04R 25/554 |
| 10,356,623 | B2 * | 7/2019 | Sadek | H04L 43/0894 |
| 2006/0083189 | A1 * | 4/2006 | Laroia | H04L 5/0044 370/208 |
| 2006/0089154 | A1 * | 4/2006 | Laroia | H04B 17/327 455/456.2 |
| 2007/0165728 | A1 * | 7/2007 | Parizhsky | H04L 27/2613 375/260 |
| 2007/0268868 | A1 * | 11/2007 | Singh | H04W 74/04 370/331 |
| 2008/0218351 | A1 * | 9/2008 | Corrado | G06K 19/0723 340/10.34 |
| 2008/0246599 | A1 * | 10/2008 | Hufton | G08B 21/245 340/529 |

(Continued)

*Primary Examiner* — Kerri L McNally
*Assistant Examiner* — Thang D Tran
(74) *Attorney, Agent, or Firm* — Cooper Legal Group, LLC

(57) ABSTRACT

One or more computing devices, systems, and/or methods for determining a time-length of an action are provided. For example, a first data packet, of a plurality of data packets, may be received from a beacon. The first data packet may be associated with a first event and may comprise a first counter value. A second data packet, of the plurality of data packets, may be received from the beacon. The second data packet may be associated with a second event and may comprise a second counter value. A time-length of an action may be determined based upon an evaluation of the first counter value and the second counter value. Compliance with a protocol may be determined by comparing the time-length of the action with a time-limit associated with the protocol. A report may be generated based upon the time-length of the action and the compliance with the protocol.

20 Claims, 8 Drawing Sheets

(56) References Cited

U.S. PATENT DOCUMENTS

| | | | | |
|---|---|---|---|---|
| 2009/0088605 A1* | 4/2009 | Ross | | G16H 40/67 370/312 |
| 2010/0117836 A1* | 5/2010 | Seyed Momen | | G16H 40/20 340/573.1 |
| 2010/0118858 A1* | 5/2010 | Pisharody | | G01S 5/021 370/349 |
| 2010/0123560 A1* | 5/2010 | Nix | | H04Q 9/00 340/10.4 |
| 2010/0262430 A1* | 10/2010 | Gips | | G08B 21/24 705/2 |
| 2013/0122807 A1* | 5/2013 | Tenarvitz | | G08B 21/245 455/41.1 |
| 2014/0086137 A1* | 3/2014 | Chen | | H04L 5/0053 370/312 |
| 2014/0180713 A1* | 6/2014 | Tenarvitz | | G08B 21/245 705/2 |
| 2015/0108901 A1* | 4/2015 | Greene | | H05B 47/19 315/149 |
| 2015/0222371 A1* | 8/2015 | Afkhami | | H04B 3/54 455/67.13 |
| 2016/0026837 A1* | 1/2016 | Good | | G16H 40/20 340/539.13 |
| 2016/0192140 A1* | 6/2016 | Park | | H04W 40/244 455/456.3 |
| 2016/0267772 A1* | 9/2016 | Iseri | | H04L 67/1097 |
| 2016/0350564 A1* | 12/2016 | Nedelcu | | G16H 40/67 |
| 2017/0256155 A1* | 9/2017 | Sengstaken, Jr. | | G06K 19/0723 |
| 2018/0103411 A1* | 4/2018 | Greene | | H05B 47/19 |
| 2018/0115982 A1* | 4/2018 | Reddy | | H04B 17/318 |
| 2018/0184383 A1* | 6/2018 | Reddy | | H04W 52/243 |
| 2018/0293873 A1* | 10/2018 | Liu | | G16H 40/20 |
| 2018/0324739 A1* | 11/2018 | Feil | | H04W 64/00 |
| 2019/0014442 A1* | 1/2019 | Yoshiie | | G01C 21/165 |
| 2019/0132784 A1* | 5/2019 | Thubert | | H04W 72/044 |
| 2019/0349929 A1* | 11/2019 | Soro | | H04L 67/535 |

* cited by examiner

METHOD AND SYSTEM FOR USING DATA PACKET BEACONING TO DETERMINE COMPLIANCE WITH PROTOCOLS

RELATED APPLICATIONS

This application claims priority to and is a continuation of U.S. application Ser. No. 16/581,585, filed on Sep. 24, 2019, entitled "METHOD AND SYSTEM FOR USING DATA PACKET BEACONING TO DETERMINE COMPLIANCE WITH PROTOCOLS", which claims the benefit of U.S. Provisional Application No. 62/735,435 filed on Sep. 24, 2018. U.S. application Ser. No. 16/581,585 and U.S. Provisional Application No. 62/735,435 are incorporated by reference herein in their entirety.

BACKGROUND

Many healthcare facilities and/or companies have a protocol for employees to follow. For example, the protocol may impose a time-limit within which employees are to interact with a dispense device after entering a room (e.g., a patient's room in a hospital).

SUMMARY

In accordance with the present disclosure, one or more computing devices and/or methods are provided. In an example, a beacon is provided. The beacon may be configured to transmit a plurality of data packets based upon a time-rate, wherein each data packet of the plurality of data packets comprises an identification number associated with the beacon and a counter value associated with a time of transmission of the data packet. The transmitting the plurality of data packets may comprise transmitting a first data packet at a first time and transmitting a second data packet at a second time based upon the first time and/or the time-rate.

In an example, a first data packet, of a plurality of data packets and associated with a first event, may be received from a beacon. The first data packet may comprise a first counter value. A second data packet, of the plurality of data packets and associated with a second event, may be received from the beacon. The second data packet may comprise a second counter value. A time-length of an action may be generated based upon an evaluation of the first counter value and the second counter value.

In an example, a first data packet may be received from a beacon, by a first device. The first data packet may comprise a first counter value. The beacon may be configured to transmit a plurality of data packets based upon a time-rate. Each data packet of the plurality of data packets may comprise an identification number associated with the beacon and a counter value associated with a time of transmission of the data packet. A first message may be generated using the first device based upon the first counter value. The first message may be transmitted by the first device to a data processing station. A second data packet may be received from the beacon, by a second device. The second data packet may comprise a second counter value. A second message may be generated using the second device based upon the second counter value. The second message may be transmitted by the second device to the data processing station. A first event associated with the first data packet may be determined, using the data processing station, based upon the first message. A first time associated with the first event may be determined, using the data processing station, based upon the first counter value. A second event associated with the second data packet may be determined, using the data processing station, based upon the second message. A second time associated with the second event may be determined, using the data processing station, based upon the second counter value. A time-length of an action may be generated, using the data processing station, based upon an evaluation of the first time and the second time.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

Figure 1:
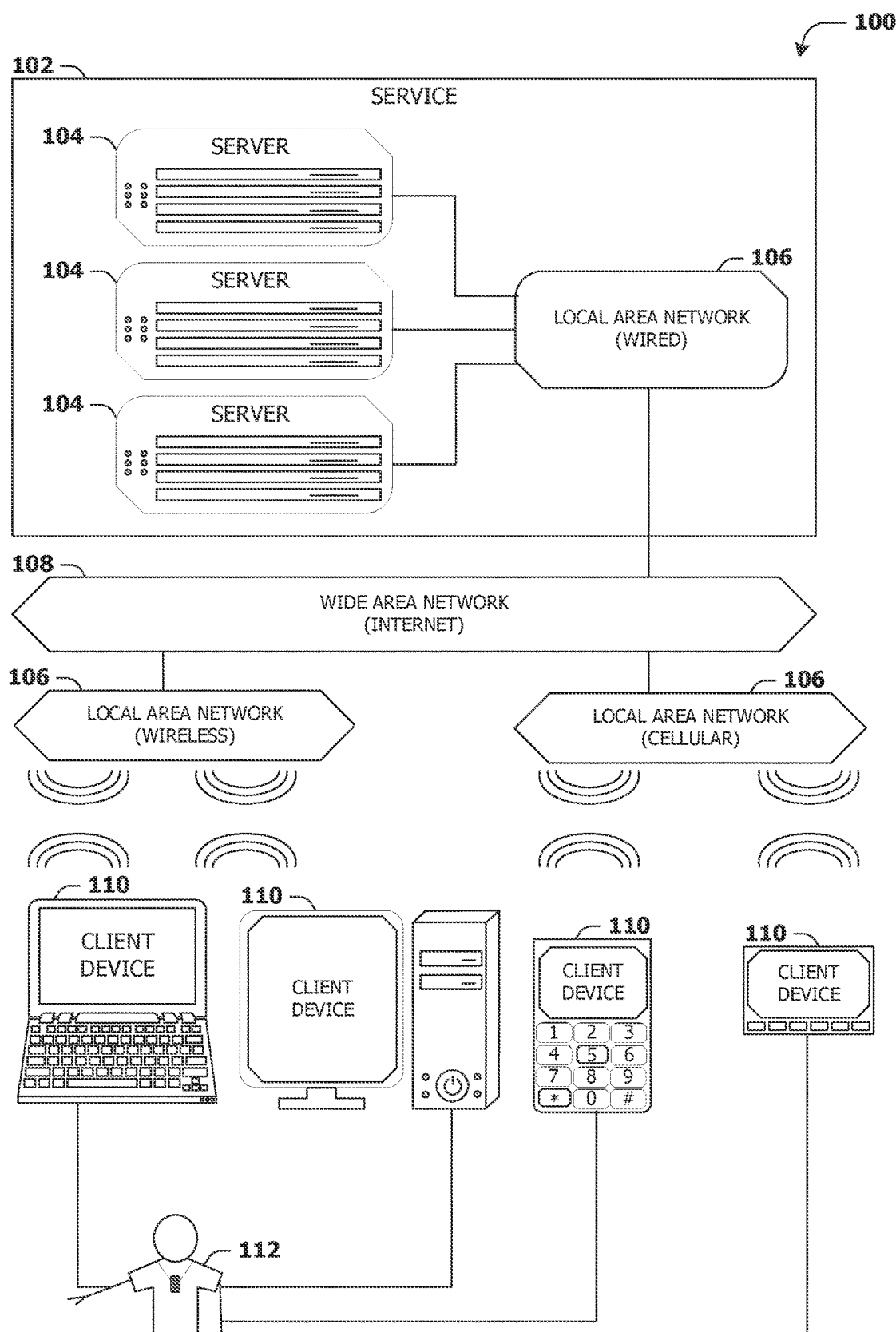
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

In the scenario 100 of FIG. 1, the service 102 may be accessed via a wide area network 108 (WAN) by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108.

One or more client devices 110 may comprise a cellular communicator and may communicate with the service 102 by connecting to the wide area network 108 via a wireless local area network 106 (LAN) provided by a cellular provider.

Alternatively and/or additionally, one or more client devices 110 may communicate with the service 102 by connecting to the wide area network 108 via a wireless local area network 106 provided by a location such as the user's home or workplace. The wireless local area network 106 may, for example, be a WiFi (Institute of Electrical and Electronics Engineers (IEEE) Standard 802.11) network or a Bluetooth (IEEE Standard 802.15.1) personal area network.

It may be appreciated that the servers 104 and the client devices 110 may communicate over various types of networks. Exemplary types of networks that may be accessed by the servers 104 and/or client devices 110 include mass storage, such as network attached storage (NAS), a storage area network (SAN), or other forms of computer or machine readable media.

The servers 104 of the service 102 may be interconnected directly, or through one or more other networking devices, such as routers, switches, and/or repeaters. The servers 104 may utilize a variety of physical networking protocols, such as Ethernet and/or Fiber Channel, and/or logical networking protocols, such as variants of an Internet Protocol (IP), a Transmission Control Protocol (TCP), and/or a User Datagram Protocol (UDP).

The servers 104 of the service 102 may be internally connected via a local area network 106. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

The local area network 106 may be a wired network where network adapters on the respective servers 104 are interconnected via cables (e.g., coaxial and/or fiber optic cabling), and may be connected in various topologies (e.g., buses, token rings, meshes, and/or trees). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

Alternatively and/or additionally, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

Figure 2:
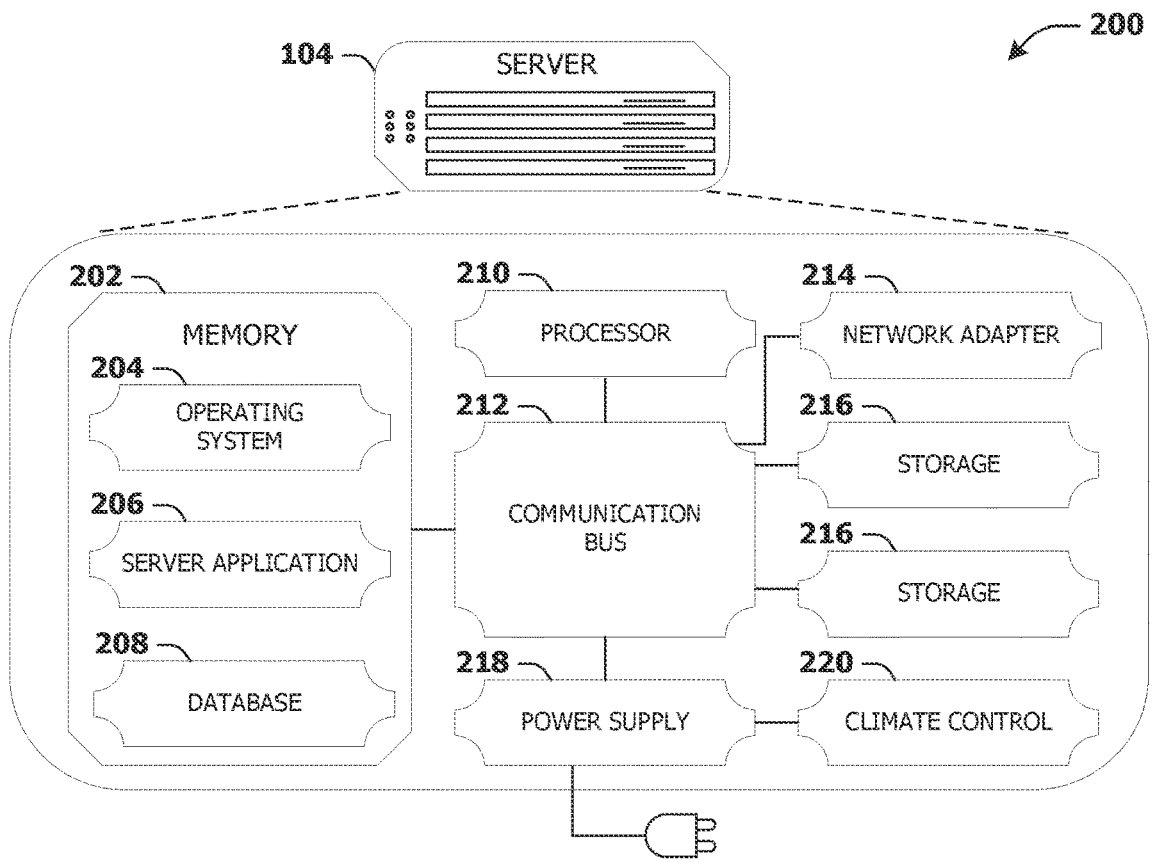
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components.

The server 104 may provide power to and/or receive power from another server and/or other devices. The server 104 may comprise a dedicated and/or shared power supply 218 that supplies and/or regulates power for the other components. The server 104 may comprise a shared and/or dedicated climate control unit 220 that regulates climate properties, such as temperature, humidity, and/or airflow.

The server 104 may include one or more other components that are not shown in the schematic diagram 200 of FIG. 2, such as a display; a display adapter, such as a graphical processing unit (GPU); input peripherals, such as a keyboard and/or mouse; and a flash memory device that may store a basic input/output system (BIOS) routine that facilitates booting the server 104 to a state of readiness. A plurality of such servers 104 may be configured and/or adapted to utilize at least a portion of the techniques presented herein.

Figure 3:
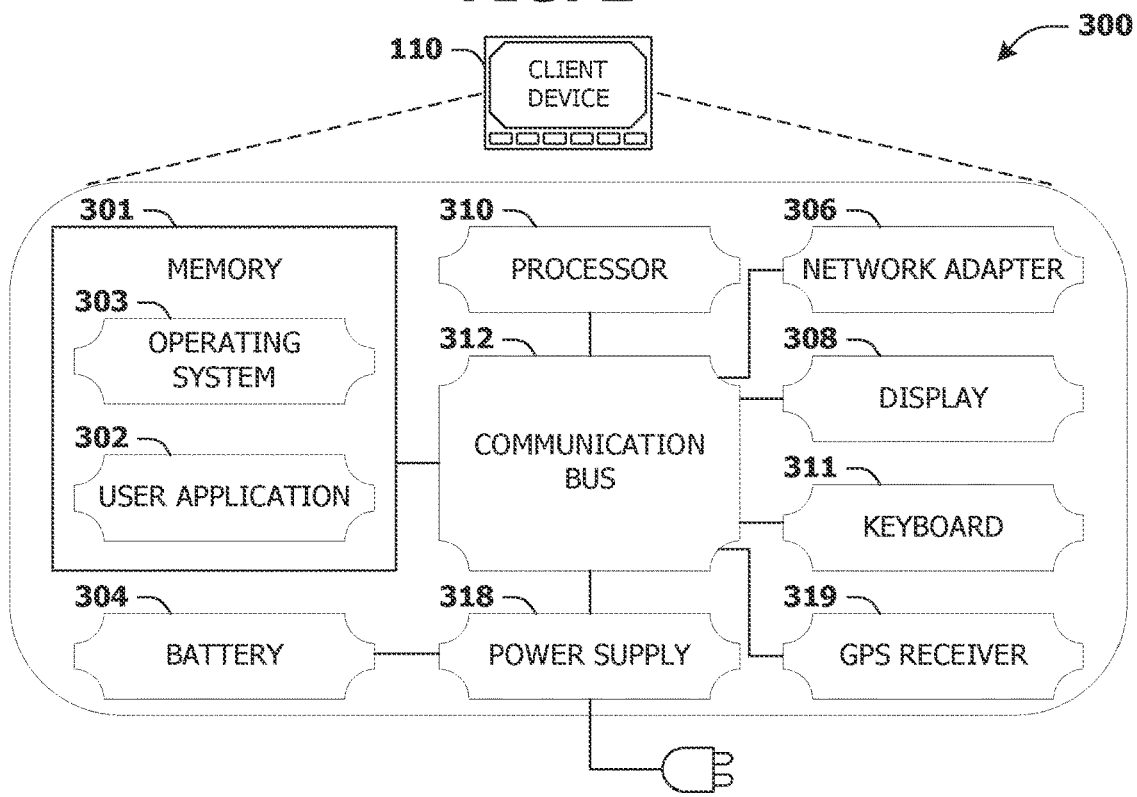
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112.

The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals.

In some examples, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified.

In such examples, descriptive content may be stored, typically along with contextual content. For example, the source of an email address (e.g., a communication received from another user via an instant messenger application) may be stored as contextual content associated with the email address. Contextual content, therefore, may identify circumstances surrounding receipt of an email address (e.g., the date or time that the email address was received), and may be associated with descriptive content. Contextual content, may, for example, be used to subsequently search for associated descriptive content. For example, a search for email addresses received from specific individuals, received via an instant messenger application or at a given date or time, may be initiated.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory.

The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol.

The client device 110 may include one or more other components that are not shown in the schematic architecture diagram 300 of FIG. 3, such as one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness. In some examples, the client device 110 may include a climate control unit that regulates climate properties, such as temperature, humidity, and airflow.

The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

The client device 110 may serve the user in a variety of roles, such as a workstation, kiosk, media player, gaming device, and/or appliance. The client device 110 may therefore be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence.

One or more computing devices and/or techniques are provided for determining a time-length of an action and/or determining compliance with a protocol based upon the time-length of the action. For example, a badge (e.g., an identification badge) may be assigned to an entity. The entity may be an employee of a healthcare facility and/or a company and/or the entity may be a device (e.g., equipment used by the healthcare facility and/or the company). In some examples, a protocol of the healthcare facility and/or the company may require that the entity enter a room (e.g., a washroom and/or a different type of room), interact with a dispense device (e.g., soap dispenser, sanitation liquid dispenser, water dispenser, etc.) and/or leave the room within a time-limit.

However, monitoring compliance (e.g., with the protocol) of the entity may require the use of significant resources including computer resources and/or human resources. To reduce the resources required to monitor compliance, the badge may comprise a first device used to communicate with one or more devices in the room using a wireless system (e.g., a Bluetooth system, a Bluetooth Low Energy system, etc.). The first device and/or the one or more devices may be used to monitor compliance of the entity (e.g., with the protocol). The first device and/or the one or more devices may (e.g., further) be used to determine a location (e.g., at a current time, at a previous time) of the entity. A report may be generated (e.g., and/or presented) based upon the compliance of the entity. Further, a location report may be generated (e.g., and/or presented). The location report may comprise a plurality of locations of the entity and/or a plurality of times corresponding to the plurality of locations.

Figure 4:
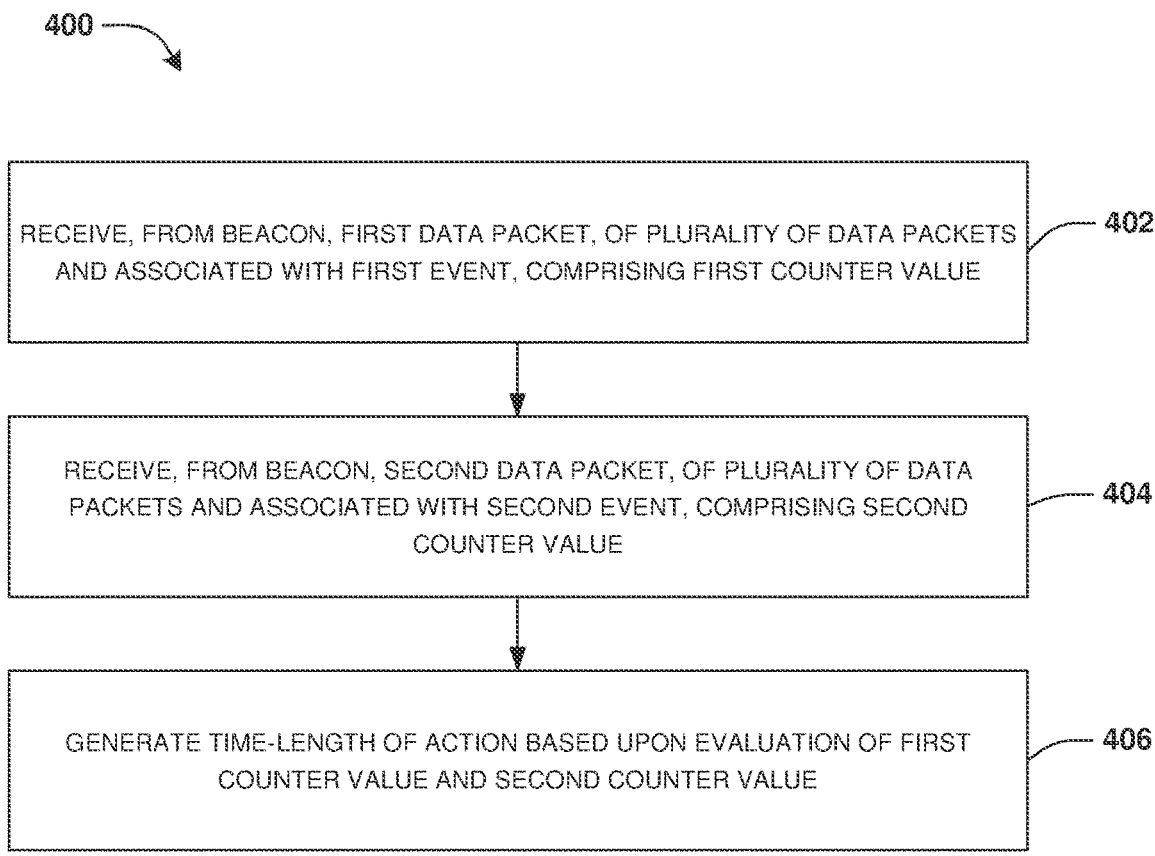
FIG. 4 is a flow chart illustrating an example method for determining a time-length of an action.

An embodiment of determining a time-length of an action is illustrated by an example method 400 of FIG. 4. A beacon may be configured to transmit a plurality of data packets based upon a time-rate. Each data packet of the plurality of data packets may comprise an identification number associated with the beacon and a counter value associated with a time of transmission of the data packet. For example, the beacon may transmit a first data packet at a first time. The beacon may (e.g., then) transmit a second data packet at a second time based upon the first time and the time-rate. In an example, the time-rate may be 1 Hz and the beacon may transmit data packets every second.

In some examples, a counter may be coupled to the beacon. The counter may be configured to increment the counter value (e.g., by one). The counter may be configured to increment the counter value based upon a time interval between increments associated with the counter. In an example, the time interval may be 1 second. Accordingly, the counter may increment the counter value (e.g., by one) every second. For example, the counter value may be equal to a first counter value at the first time. The counter value may be equal to a second counter value at the second time. In an example, the second time may be five seconds after the first time and the second counter value may be equal to the first counter value plus five.

In some examples, the beacon (e.g., and/or the counter) may be comprised within a badge (e.g., an identification badge). The badge may be a device assigned to an entity. The entity may be a person who is an employee of a healthcare facility (e.g., a doctor, a nurse, a technician, etc.), a person who is an employee of a (e.g., different type of) facility and/or a company, a contractor, a patient of the healthcare facility, a customer of the facility and/or the company, etc. Alternatively and/or additionally, the entity may be an object (e.g., equipment, a device, etc.) that is used at the healthcare facility, the facility and/or the company, etc. The badge may be configured to assist in tracking events and/or actions associated with the entity. In some examples, the badge may be a wearable (e.g., clip-on) device, a card-sized apparatus, a pin, glasses, a sticker, etc.

At 402, the first data packet, of the plurality of data packets, may be received (e.g., by a first device). The first data packet may be associated with a first event and may comprise the first counter value. In some examples, the first device may be configured to retain (e.g., and/or react to) a first plurality of data packets of the plurality of data packets having signal strengths exceeding a first signal strength threshold. In some examples, the first device may be configured to discard a second plurality of data packets of the plurality of data packets having signal strengths less than the first signal strength threshold. In some examples, a first signal strength of the first plurality of data packets may correspond to a distance between the beacon and the first device. For example, the first signal strength of the first plurality of data packets may be greater than a second signal strength of at least one of the second plurality of data packets as the beacon may be a first distance (e.g., 2 feet) away from the first device when the first plurality of data packets are received while the beacon may be a second distance (e.g., 4 feet) away from the first device when the second plurality of data packets are received.

In some examples, the first signal strength threshold may be configured such that the first data packet is retained responsive to an occurrence the first event. For example, the first event may comprise the entity (e.g., and/or the beacon) entering a room. Responsive to the entity (e.g., and/or the beacon) entering the room and/or being inside of the room, the first signal strength of the first plurality of data packets may exceed the first signal strength threshold. Accordingly, the first plurality of data packets may be retained by the first device responsive to the entity entering the room and/or being inside of the room. Alternatively and/or additionally, a portion of the first plurality of data packets may be discarded by the first device responsive to determining that the first plurality of data packets are received from the (e.g., same) beacon and/or that data packets of the portion of the first plurality of data packets are received within a timeframe. For example, responsive to receiving a set of (e.g., more than one) data packets from the (e.g., same) beacon within the timeframe, one data packet of the set of data packets may be retained and/or other (e.g., remaining and/or not retained) data packets of the set of data packets may be discarded.

At 404, the second data packet, of the plurality of data packets, may be received (e.g., by a second device). The second data packet may be associated with a second event and may comprise the second counter value. In some examples, the second device may be configured to retain the second data packet responsive to determining a second signal strength of the second data packet exceeds a second signal strength threshold. In some examples, the second device may be configured to discard one or more data packets transmitted by one or more (e.g., other) beacons responsive to determining that the second signal strength of the second data packet is higher than signal strengths of the one or more data packets. In some examples, the second signal strength may correspond to a distance between the beacon and the second device.

In some examples, the second event may comprise one or more interactions with a dispense device (e.g., soap dispenser, sanitation liquid dispenser, water dispenser, etc.) by the entity. In some examples, the second device may be configured to detect interactions with the dispense device. The second device may be comprised within the dispense device and/or the second device may be coupled to the dispense device. In some examples, the second device may comprise an activity detector and/or be coupled to the activity detector configured to activate (e.g., a receiver of) the second device responsive to detecting one or more interactions with the dispense device. For example, responsive to detecting activation of the dispense device (e.g., detecting a hand underneath the dispense device, detecting a button of the dispense device being pressed, detecting dispensing of sanitation substances by the dispense device, etc.), the activity detector may activate (e.g., the receiver of) the second device. Accordingly, the second data packet (e.g., transmitted by the beacon) may be received by the second device (e.g., via the receiver) responsive to one or more interactions with the dispense device by the entity.

In some examples, the first device may generate a first message based upon the first counter value. The first message may comprise the identification number (e.g., associated with the beacon), the first counter value, a second identification number associated with the first device and/or a signal strength of the first data packet (e.g., a received signal strength indicator (RSSI) corresponding to the first data packet). The first device may transmit the first message to a data collection device and/or a data processing station.

In some examples, the first device may (e.g., further) generate a plurality of messages based upon the first plurality of data packets (e.g., retained by the first device). Each message of the plurality of messages may comprise the identification number, a counter value corresponding to a data packet of the first plurality of data packets, the second identification number and/or a signal strength corresponding to a data packet of the first plurality of data packets.

Alternatively and/or additionally, the second device may generate a second message based upon the second counter value. The second message may comprise the identification number, the second counter value, a third identification number associated with the second device and/or a signal strength of the second data packet (e.g., an RSSI corresponding to the second data packet). The second device may transmit the second message to the data collection device and/or the data processing station.

In some examples, the first device may periodically transmit the first message to the data collection device and/or the data processing station (e.g., in order to ensure reception of the first message by the data collection device and/or the data processing station). For example, the first device may transmit the first message every five seconds, five minutes, 50 minutes, etc. A number of transmissions of the first message may be configured based upon a success rate of transmissions of the first device. Accordingly, the number of transmissions of the first message may be configured to ensure that the data collection device and/or the data processing station receives the first message. Alternatively and/or additionally, the first device may periodically transmit the first message to the data collection device and/or the data processing station until a confirmation message (e.g., confirming receipt of the first message) is received from the data collection device and/or the data processing station.

In some examples, each transmission of the first message to the data collection device and/or the data processing station may comprise an indication of an amount of time passed since the first data packet was received by the first device. Accordingly, the data collection device and/or the data processing station may assign a first timestamp to the first message corresponding to the first time (e.g., that the first message is received by the first device) based upon a third time (e.g., that the first message is received by the data collection device and/or the data processing station) and the indication of the amount of time passed since the first data packet was received by the first device.

In some examples, the second device may periodically transmit the second message to the data collection device and/or the data processing station (e.g., in order to ensure reception of the second message by the data collection device and/or the data processing station). For example, the second device may transmit the second message every five seconds, five minutes, 50 minutes, etc. A number of transmissions of the second message may be configured based upon a success rate of transmissions of the second device. Accordingly, the number of transmissions of the second message may be configured to ensure that the data collection device and/or the data processing station receives the second message. In some examples, the number of transmissions of the second message may be equal to the number of transmissions of the first message. Alternatively and/or additionally, the second device may periodically transmit the second message to the data collection device and/or the data processing station until a confirmation message (e.g., confirming receipt of the second message) is received from the data collection device and/or the data processing station.

In some examples, each transmission of the second message to the data collection device and/or the data processing station may comprise an indication of an amount of time passed since the second data packet was received by the second device. Accordingly, the data collection device and/or the data processing station may assign a second timestamp to the second message corresponding to the second time (e.g., that the second message is received by the second device) based upon a fourth time (e.g., that the second message is received by the data collection device and/or the data processing station) and the indication of the amount of time passed since the second data packet was received by the second device.

In some examples, the first device may transmit the first message to the data collection device and the second device may transmit the second message to the data collection device. In some examples, the data collection device may be configured to transmit the first message and/or the second message to the data processing station. Alternatively and/or additionally, the first device may transmit the first message (e.g., directly) to the data processing station and/or the second device may transmit the second message (e.g., directly) to the data processing station.

At 406, a time-length of an action may be generated based upon an evaluation of the first counter value and the second counter value. In some examples, the action may comprise the entity entering the room and interacting with the dispense device. In some examples, the data processing station may identify the entity based upon the identification number within the first message and/or the second message. Alternatively and/or additionally, the data processing station may identify the first event based upon the second identification number and/or the signal strength of the first data packet within the first message. For example, the data processing station may identify the room (e.g., associated with the action) based upon the second identification number and the data processing station may identify the entering of the room by the entity based upon the signal strength of the first data packet. Further, the data processing station may associate the first message (e.g., generated based upon the first data packet) with the first event by comparing the first counter value and/or the signal strength of the first data packet with a plurality of counter values and/or a plurality of signal strengths comprised within the plurality of messages generated based upon the first plurality of data packets (e.g., retained by the first device). Alternatively and/or additionally, the data processing station may identify the second event based upon the third identification number within the second message.

An (e.g., mathematical) operation, such as a combination (e.g., addition, subtraction, multiplication, division, etc.), may be performed on the first counter value (e.g., corresponding to the first event) and the second counter value (e.g., corresponding to the second event) based upon the time-rate to determine the time-length of the action. The time-length of the action may correspond to a time between transmission of the first data packet (e.g., by the beacon) and transmission of the second data packet (e.g., by the beacon) during which the entity may enter the room and interact with the dispense device. In some examples, a time and/or a date of the action may be determined based upon the first time-stamp, the second time-stamp, the first counter value and/or the second counter value. Alternatively and/or additionally, the data processing station may determine the first time based upon the first time-stamp and/or the first counter value. The data processing station may (e.g., then) determine the second time based upon second time-stamp and/or the second counter value. An (e.g., mathematical) operation may (e.g., then) be performed on the first time and/or the second time to determine the time-length of the action. For example, a difference between the first time and the second time may be determined (e.g., and divided by the time-rate) to determine the time-length.

In some examples, the healthcare facility (e.g., and/or the company) may have a protocol for entering the room and interacting with the dispense device. For example, the protocol may require a time-limit between entering the room and interacting with the dispense device. In some examples, the data processing station may determine compliance with the protocol by comparing the time-length of the action with the time-limit. In an example, the time-length of the action may be 13 seconds and the time-limit associated with the protocol may be 15 seconds. Accordingly, the data processing station may determine that the time-length of the action is compliant with the protocol. In a second example, the time-length of the action may be 17 seconds and the time-limit associated with the protocol may be 15 seconds. Accordingly, the data processing station may determine that the time-length of the action is not compliant with the protocol. In some examples, a report may be generated (e.g., by the data processing station) comprising the identification number, the time-length of the action and/or the compliance (e.g., with the protocol).

In some examples, a time-length of a second action may be generated based upon an evaluation of the first counter value, the second counter value and/or a third counter value. The second action may comprise the entity entering the room, interacting with the dispense device and/or leaving the room. In some examples, the data processing station may identify a third event (e.g., the entity leaving the room) based upon the second identification number (e.g., of the first device) and/or a signal strength of a third data packet within a third message (e.g., of the plurality messages generated based upon the first plurality of data packets retained by the first device). Further, the data processing station may associate the third message (e.g., generated based upon the third data packet) with the third event by evaluating the plurality of counter values and/or the plurality of signal strengths comprised within the plurality of messages. An (e.g., mathematical) operation may be performed on the first counter value, the second counter value and/or the third counter value to determine the time-length of the second action. The data processing station may determine compliance with the protocol by comparing the time-length of the second action with a second time-limit for entering the room, interacting with the dispense device and leaving the room.

In some examples, the beacon, the first device and/or the second device may communicate (e.g., perform transmissions of data and/or receptions of data) using a wireless system (e.g., a Bluetooth system, a Bluetooth Low Energy system, etc.). In some examples, the beacon may transmit the plurality of data packets using one or more first channels of the wireless system. For example, the beacon may transmit the plurality of data packets using a first channel of the wireless system at a first time-rate and/or a first power level. In some examples, the first power level may be configured (e.g., controlled) such that one or more (e.g., other) devices located in one or more (e.g., other) rooms may not receive and/or may not retain data packets of the plurality of data packets transmitted while the beacon is in the room. In some examples, the first time-rate may be configured to ensure reception (e.g., by the first device) of the first data packet and/or the first plurality of data packets (e.g., transmitted by the beacon while the entity is entering the room, inside of the room and/or leaving the room).

The beacon may transmit the plurality of data packets using a second channel of the wireless system at a second time-rate and/or a second power level. In some examples, the first device may receive the first data packet using the first channel. Alternatively and/or additionally, the second device may receive the second data packet using the second channel. In some examples, the second time-rate may be higher than the first time-rate. For example, the second time-rate may be 4 Hz and the first time-rate may be 1 Hz. It may be appreciated that the second time-rate may be configured (e.g., controlled) to ensure reception of the second data packet (e.g., by the second device) responsive to the entity interacting with the dispense device (e.g., and/or responsive to activation of the dispense device). In some examples, the second power level may be lower (e.g., and/or higher) than the first power level. For example, the second power level may be 2, 4, 10, 15, 17, 70, etc. times lower than the first power level. It may be appreciated that the second power level may be configured (e.g., controlled) to reduce interference between beacons and/or to ensure reception of the second data packet (e.g., from the beacon) responsive to the entity interacting with the dispense device (e.g., and that a different data packet from a second beacon assigned to a second entity is not received by the second device).

In some examples, the beacon may continuously (e.g., and/or always) transmit data packets (e.g., until a power source of the beacon is exhausted). Alternatively and/or additionally, the beacon may transmit data packets responsive to the beacon being activated and may stop transmitting data packets responsive to being deactivated. For example, the beacon may become activated responsive to (e.g., the beacon) entering (e.g., a zone of) a building (e.g., associated with the healthcare facility, the company, etc.) and/or may become deactivated responsive to (e.g., the beacon) exiting (e.g., the zone of) the building.

Alternatively and/or additionally, the beacon may be coupled to an accelerometer. The accelerometer may activate the beacon responsive to sensing movement of the beacon. The accelerometer may deactivate the beacon responsive to sensing that the beacon is not moving. Alternatively and/or additionally, the beacon may be coupled to one or more capacitance sensors. The one or more capacitance sensors may activate the beacon responsive to sensing that the badge is attached to (e.g., worn by, held by, etc.) the entity. The one or more capacitance sensors may deactivate the beacon responsive to sensing that the badge is not attached to the entity. It may be appreciated that deactivating the beacon (e.g., and/or stopping transmission of data packets) may reduce power usage of the beacon.

In some examples, the first device may continuously (e.g., and/or always) operate in an operational state (e.g., and/or a receiver of the first device may continuously be activated). Alternatively and/or additionally, the first device may operate in the operational state during specific times (e.g., such as when the building is open, such as during business hours of the building, etc.) and/or may switch to operating in a low power state (e.g., wherein the receiver of the first device may not be activated) outside of the specific times.

Alternatively and/or additionally, the first device may continuously switch between operating in the operational state and operating in the low power state. For example, the first device may be configured to operate in the operational state for an operational time-length and operate in the low power state for a low power time-length. In an example, the first device may be configured to operate in the operational state for 1 second (e.g., and/or a different operational time-length such as 0.5 seconds, 0.75 seconds, 1.25 seconds, etc.), switch to operating in the low power state for 0.5 seconds (e.g., and/or a different low power time-length such as 0.25 seconds, 0.75 seconds, 1 second, etc.), (e.g., then) switch (e.g., back) to operating in the operational state (e.g., for the operational time-length), etc. It may be appreciated that operating the first device in the low power state may reduce power usage of the first device.

In some examples, the first device may be coupled to a second activity detector. The second activity detector may be configured to activate the first device responsive to detecting one or more entities entering the room, one or more entities in the room and/or one or more entities leaving the room. Accordingly, the first device may operate in the low power state until switching to operating in the operational state responsive to the second activity detector detecting one or more entities entering the room, the second activity detector detecting one or more entities in the room and/or the second activity detector detecting one or more entities leaving the room.

In some examples, the first device and/or the second device may transmit the first message and/or the second message using one or more second channels of the wireless system. For example, the first device may transmit the first message to the data collection device using a third channel of the wireless system and/or the second device may transmit the second message to the data collection device using the third channel. It may be appreciated that transmitting the first message and/or the second message using a different channel than the plurality of data packets may reduce interference between beacons, the first device and/or the second device.

In some examples, the first device may comprise a room sensor and/or the second device may comprise a dispense device sensor. In some examples, the building (e.g., of the healthcare facility, the company, etc.) may comprise a plurality of room sensors and/or a plurality of dispense device sensors. Each room sensor of the plurality of room sensors may be comprised within a room of a plurality of rooms of the building (e.g., wherein each room of the plurality of rooms comprises a room sensor of the plurality of room sensors). In some examples, the plurality of rooms may comprise every room, some rooms, every sanitation room, some sanitation rooms, every hallway, some hallways, etc. of the building.

Alternatively and/or additionally, each dispense device sensor of the plurality of dispense device sensors may be comprised within and/or coupled to a dispense device of a plurality of dispense devices of the building (e.g., wherein each dispense device of the plurality of dispense devices may comprise and/or be coupled to a dispense device sensor of the plurality of dispense device sensors). In some examples, each room sensor of the plurality of room sensors may be assigned to a data collection device (e.g., and/or may transmit messages to the data collection device) of a plurality of data collection devices. Alternatively and/or additionally, each dispense device sensor of the plurality of dispense device sensors may be assigned to a data collection device of the plurality of data collection devices.

In some examples, a first set of room sensors of the plurality of room sensors and/or a first set of dispense device sensors of the plurality of dispense device sensors may be assigned to a first data collection device. The first set of room sensors and/or the first set of dispense device sensors may be located in a first part of the building (e.g., a first floor of the building, a first set of rooms of the building, etc.).

Alternatively and/or additionally, a second set of room sensors of the plurality of room sensors and/or a second set of dispense device sensors of the plurality of dispense device sensors may be assigned to a second data collection device. The second set of room sensors and/or the second set of dispense device sensors may be located in a second part of the building. In some examples, a number of devices (e.g., room sensors and/or dispense device sensors) assigned to a data collection device and/or a proximity of the data collection device to the devices assigned to the data collection device may be configured to ensure reception of transmissions performed by the devices and/or to optimize power usages of the devices in performing the transmissions. In some examples, each data collection device of the plurality of data collection devices may transmit messages to the data processing station (e.g., and/or a second data processing station).

In some examples, responsive to generating a fourth message based upon a fourth data packet, a third device (e.g., a room sensor of the plurality of room sensors or a dispense device sensor of the plurality of dispense device sensors) may listen to the third channel (e.g., of the wireless system) such as by using a Listen Before Talk (LBT) system. Responsive to determining that the third channel is being used (e.g., by a different room sensor of the plurality of room sensors and/or by a different dispense device sensor of the plurality of dispense device sensors), the third device may (e.g., further) listen to the third channel. Responsive to determining that the third channel is open (e.g., and/or is not being used), the third device may implement a (e.g., back-off) delay. For example, responsive to determining that the third channel is open, the third device may transmit the fourth message after a time corresponding to the delay.

In some examples, each room sensor of the plurality of room sensors and/or each dispense device sensor of the plurality of dispense device sensors may be assigned a unique delay such that more than one message is not transmitted using the third channel at a time. For example, responsive to generating a fifth message based upon a fifth data packet, a fourth device (e.g., a room sensor of the plurality of room sensors or a dispense device sensor of the plurality of dispense device sensors) may listen to the third channel until the fourth device determines that the third channel is open at a (e.g., same) time that the third device determines that the third channel is open. Responsive to determining that the third channel is open, the fourth device may implement a second delay (e.g., different from the delay associated with the third device). Accordingly, the fourth device may transmit the fifth message after a second time corresponding to the second delay. Accordingly, the fourth message and the fifth message are transmitted (e.g., using the third channel) at different times.

In some examples, the beacon may not comprise the counter (e.g., and/or a plurality of beacons comprised within a plurality of badges assigned to a plurality of entities may not comprise counters). Alternatively and/or additionally, the first device may comprise a second counter (e.g., and/or each room sensor of the plurality of room sensors may comprise a counter) and the second device may comprise a third counter (e.g., and/or each dispense device sensor of the plurality of dispense device sensors may comprise a counter). Accordingly, the first data packet (e.g., transmitted by the beacon) may not comprise the first counter value and/or the second data packet (e.g., transmitted by the beacon) may not comprise the second counter value. In some examples, responsive to receiving the first data packet (e.g., comprising the identification number), the first device may generate the first message comprising a fourth counter value using the third counter. Alternatively and/or additionally, responsive to receiving the second data packet (e.g., comprising the identification number), the second device may generate the second message comprising a fifth counter value using the fourth counter. In some examples, the second counter, the third counter and/or a plurality of (e.g., other) counters comprised within room sensors and/or dispense device sensors may be calibrated periodically (e.g., once per hour, once per day, once per week, etc.).

In some examples, the beacon may listen to the first channel (e.g., and/or the second channel) such as by using an LBT system. Responsive to determining that the first channel (e.g., and/or the second channel) is being used by one or more (e.g., other) beacons, the beacon may (e.g., further) listen to the first channel (e.g., and/or the second channel). Responsive to determining that the first channel (e.g., and/or the second channel) is open, the beacon may implement a delay. Alternatively and/or additionally, responsive to determining that the first channel (e.g., and/or the second channel) is open, the beacon may (e.g., immediately) transmit a data packet (e.g., of the plurality of data packets). It may be appreciated that usage of the LBT system by the beacon may ensure (e.g., and/or increase a likelihood) that the data packet is received by the first device and/or the second device (e.g., and/or a different device).

In some examples, a location (e.g., at a current time and/or a previous time) of the entity and/or the beacon may be determined by the data processing station based upon the plurality of data packets and/or a plurality of messages associated with the entity and/or the beacon. For example, the data processing station may determine that a room sensor and/or a dispense device sensor transmitted one or more messages associated with the entity at a given time. In some examples, the location of the entity at the given time may be determined based upon an identification number corresponding to the room sensor and/or the dispense device sensor and/or one or more signal strengths (e.g., one or more RSSIs comprised within the one or more messages) of one or more data packets corresponding to the one or more messages. In some examples, a location report may be generated (e.g., and/or presented). The location report may comprise a plurality of locations of the entity and/or a plurality of times corresponding to the plurality of locations.

In some examples, the location report may be generated in response to a request for a report associated with one or more criteria (e.g., identifier of the entity, times, locations, etc.). The location report may comprise merely information about the entity, or may comprise information about a plurality of entities, including the entity, associated with the one or more criteria.

Figure 5A:
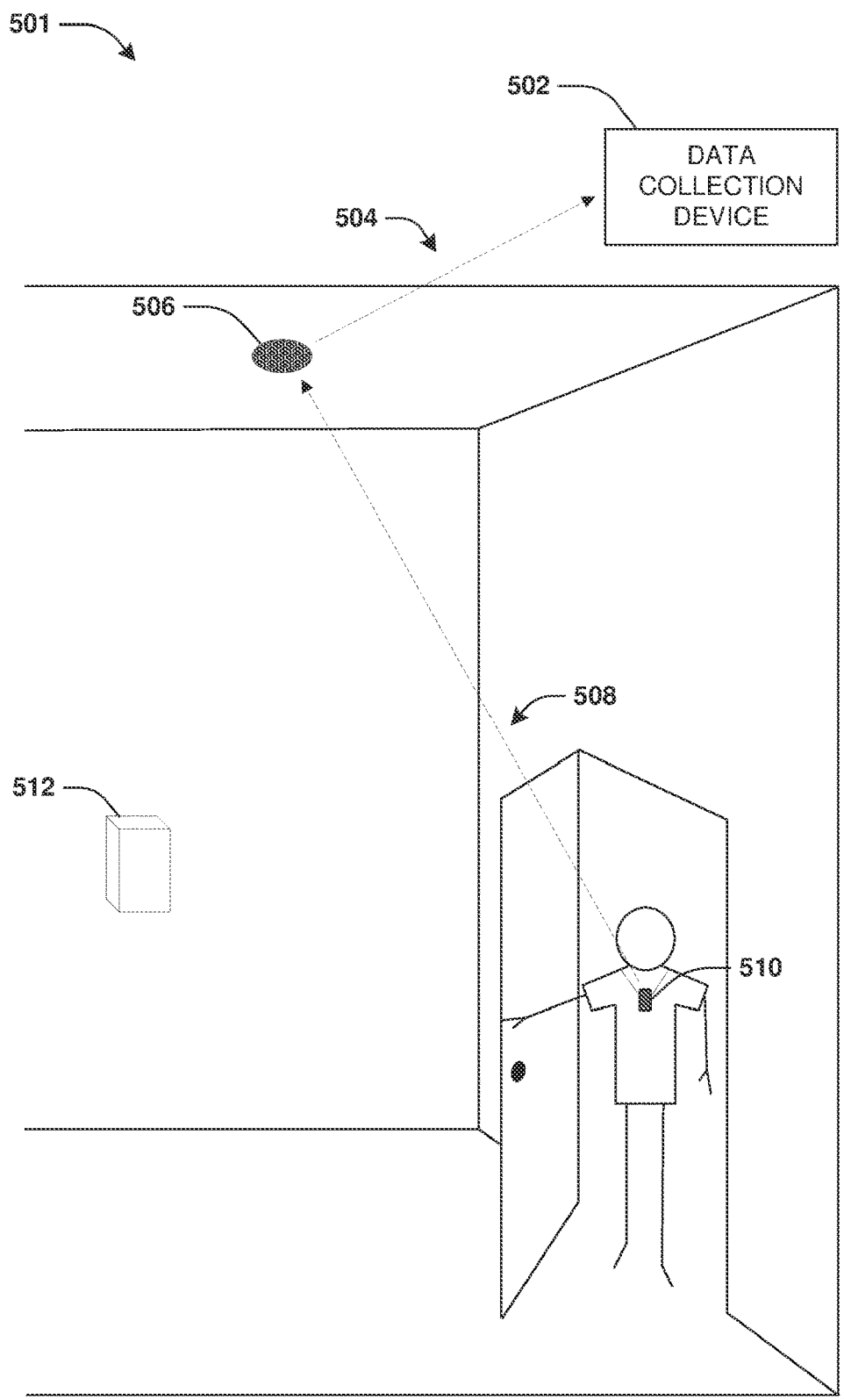
FIG. 5A is a component block diagram illustrating an example system for determining a time-length of an action, where a first device receives a first data packet, associated with a first event, from a beacon.
Figure 5B:
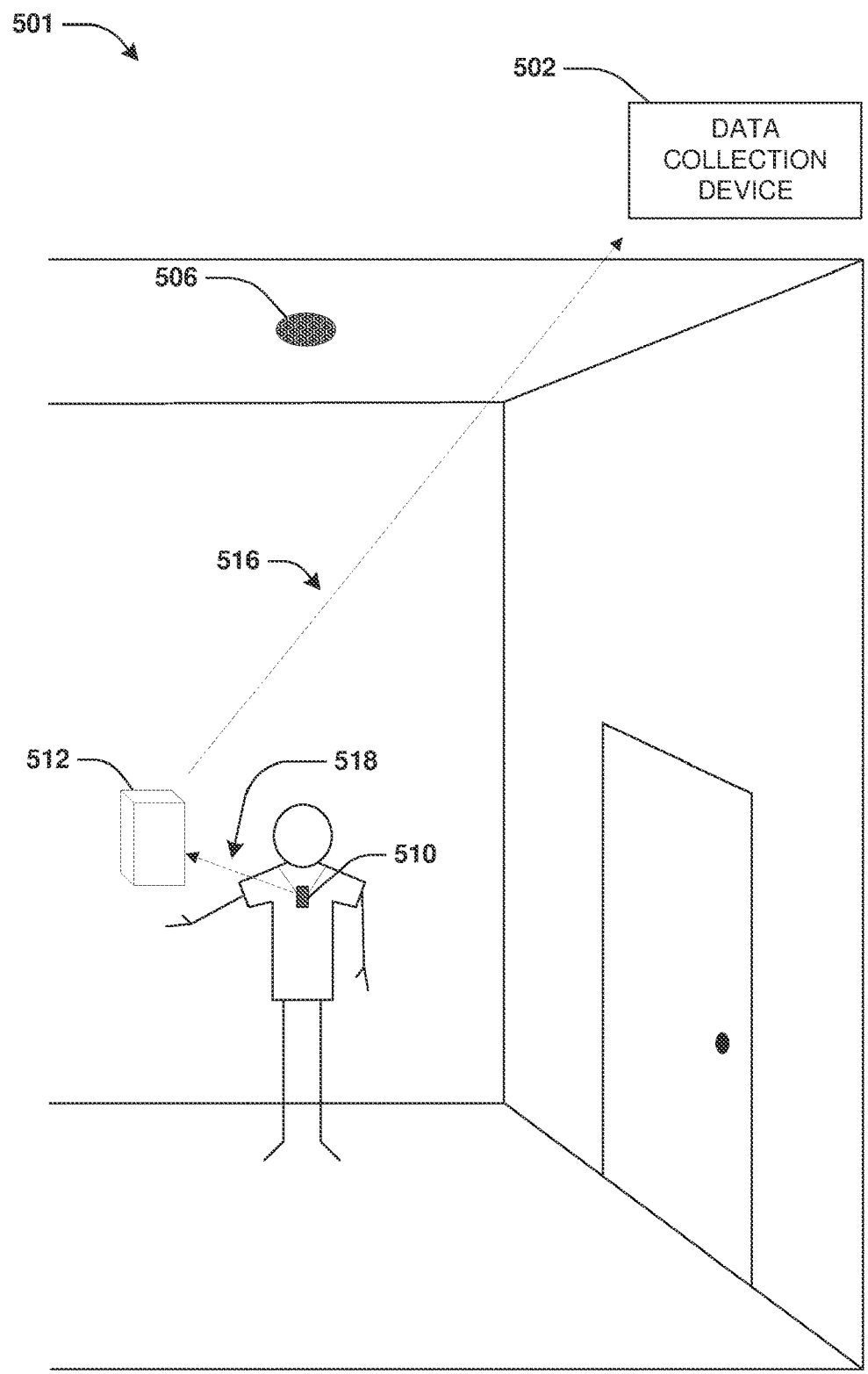
FIG. 5B is a component block diagram illustrating an example system for determining a time-length of an action, where a second device receives a second data packet, associated with a second event, from a beacon.

FIGS. 5A-5B illustrate examples of a system 501 for determining a time-length of an action. FIG. 5A illustrates a first device 506 receiving a first data packet 508, associated with a first event, from a beacon comprised within a badge 510 assigned to an entity. In some examples, the first event may comprise the entity entering a room. The first device 506 may comprise a room sensor. The beacon (e.g., comprised within the badge 510) may be configured to transmit a plurality of data packets based upon a time-rate. Each data packet of the plurality of data packets may comprise an identification number associated with the beacon (e.g., and/or the badge 510) and a counter value associated with a time of transmission of the data packet. In some examples, responsive to the entity entering the room, the first device 506 may receive and/or retain the first data packet 508 of the plurality of data packets. The first data packet 508 may comprise the identification number and/or a first counter value. In some examples, responsive to receiving the first data packet 508, the first device 506 may be configured to generate a first message 504, based upon the first data packet 508. The first message 504 may comprise the identification number, the first counter value, a second identification number associated with the first device 506 and/or a signal strength of the first data packet 508 (e.g., an RSSI corresponding to the first data packet 508). The first device 506 may transmit the first message 504 to a data collection device 502.

FIG. 5B illustrates a second device receiving a second data packet 518, associated with a second event, from the beacon (e.g., comprised within the badge 510). The second device may comprise a dispense device sensor comprised within a dispense device 512 and/or coupled to the dispense device 512. In some examples, the second event may comprise one or more interactions with the dispense device 512 by the entity. In some examples, the second device may comprise an activity detector and/or be coupled to the activity detector. The activity detector may be configured to activate a receiver of the second device responsive to detecting one or more interactions with the dispense device 512. For example, responsive to activation of the dispense device (e.g., detecting a hand of the entity underneath the dispense device), the activity detector may activate the receiver of the second device. Accordingly, the second data packet 518 may be received by the second device responsive to one or more interactions with the dispense device 512 by the entity. In some examples, responsive to receiving the second data packet 518, the second device may generate a second message 516, based upon the second data packet 518. The second message 516 may comprise the identification number, a second counter value (e.g., comprised within the second data packet 518), a third identification number associated with the second device and/or a signal strength of the second data packet 518 (e.g., an RSSI corresponding to the second data packet 518). The second device may transmit the second message 516 to the data collection device 502.

In some examples, the data collection device 502 may transmit the first message 504 and/or the second message 516 to a data processing station. In some examples, the data processing station may determine a time-length of an action based upon an evaluation of the first counter value and/or the second counter value. The action may comprise the entity entering the room and interacting with the dispense device 512.

Figure 6:
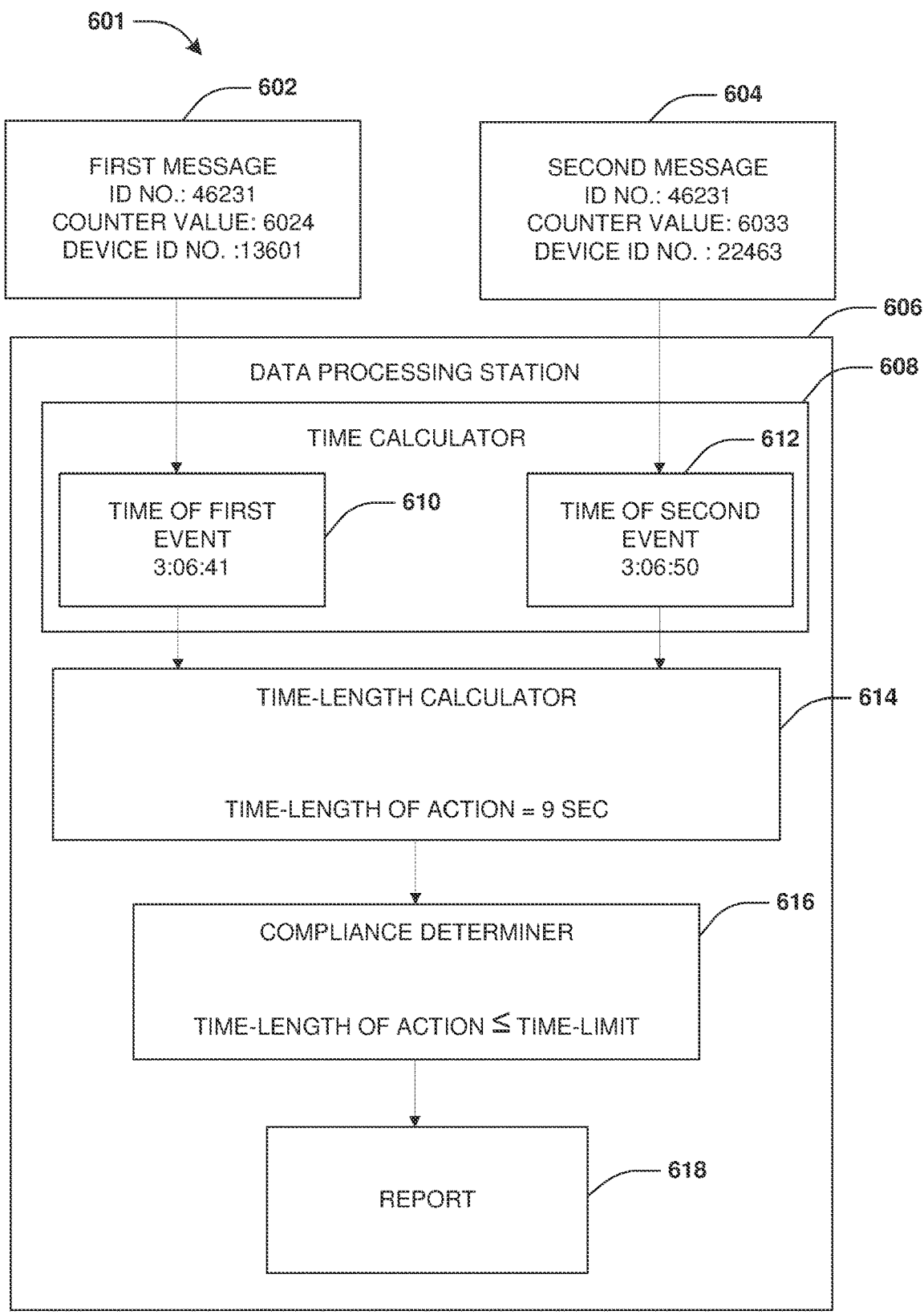
FIG. 6 is a component block diagram illustrating an example system for determining a time-length of an action and/or determining compliance with a protocol based upon the time-length of the action.

FIG. 6 illustrates an example of a system 601 for determining a time-length of an action and/or determining compliance with a protocol based upon the time-length of the action. A first message 602 associated with a first event may be received by a data processing station 606. The first event may comprise an entity entering a room. In some examples, the first message 602 may comprise an identification number "46231" associated with a first device. The first device may be comprised within a badge assigned to the entity. The first message 602 may (e.g., further) comprise a first counter value "6024" corresponding to a first time 610 of the first event and/or a second identification number "13601" corresponding to a second device that generated the first message 602. The first message 602 may (e.g., further) comprise a first time-stamp corresponding to the first time 610. A second message 604 associated with a second event may be received by the data processing station 606. The second event may comprise the entity interacting with a dispense device. In some examples, the second message 604 may comprise the identification number "46231", a second counter value "6033" corresponding to a second time 612 of the second event and/or a third identification number "22463" corresponding to a third device that generated the second message 604. The second message 604 may (e.g., further) comprise a second time-stamp corresponding to the second time 612.

In some examples, a time calculator 608 of the data processing station 606 may determine the first time 610 based upon the first counter value "6024" and/or the first time-stamp. The time calculator 608 may determine the second time 612 based upon the second counter value "6033" and/or the second time-stamp.

In some examples, a time-length calculator 614 may determine the time-length of the action to be 9 seconds. For example, the time-length of the action may be determined by performing an (e.g., mathematical) operation on the first counter value "6024" and/or the second counter value "6033". Alternatively and/or additionally, the time-length of the action may be determined by performing a mathematical operation on the first time 610 and/or the second time 612.

In some examples, a compliance determiner 616 may determine compliance with a protocol of a healthcare facility (e.g., and/or a company). For example, the healthcare facility may have the protocol for (e.g., the entity) entering the room and interacting with the dispense device. The protocol may require a time-limit between entering the room and interacting with the dispense device. The compliance determiner 616 may determine compliance with the protocol by comparing the time-length of the action with the time-limit. In an example, the time-limit associated with the protocol may be 7 seconds. Accordingly, the compliance determiner 616 may determine that the time-length of the action (e.g., 9 seconds) is not compliant with the protocol. In a second example, the time-limit associated with the protocol may be 10 seconds. Accordingly, the compliance determiner 616 may determine that the time-length of the action (e.g., 9 seconds) is compliant with the protocol. In some examples, a report 618 may be generated (e.g., by the data processing station 606) comprising the identification number, the time-length of the action and/or the compliance (e.g., with the protocol).

In some examples, in response to determining that the time-length of the action is not compliant with the protocol, the report 618 may be generated and/or transmitted to the corresponding entity and/or a manager associated with the corresponding entity. For example, the report 618 may be transmitted as part of instructions causing a graphical user interface of a display of a device of the corresponding entity and/or the manager to display at least some of the report 618 and/or a warning to modify behavior. Transmission of the instructions may be controlled to cause reports to be sent to (e.g., only) devices associated with entities that do not comply with the protocol at least a threshold amount.

Figure 7:
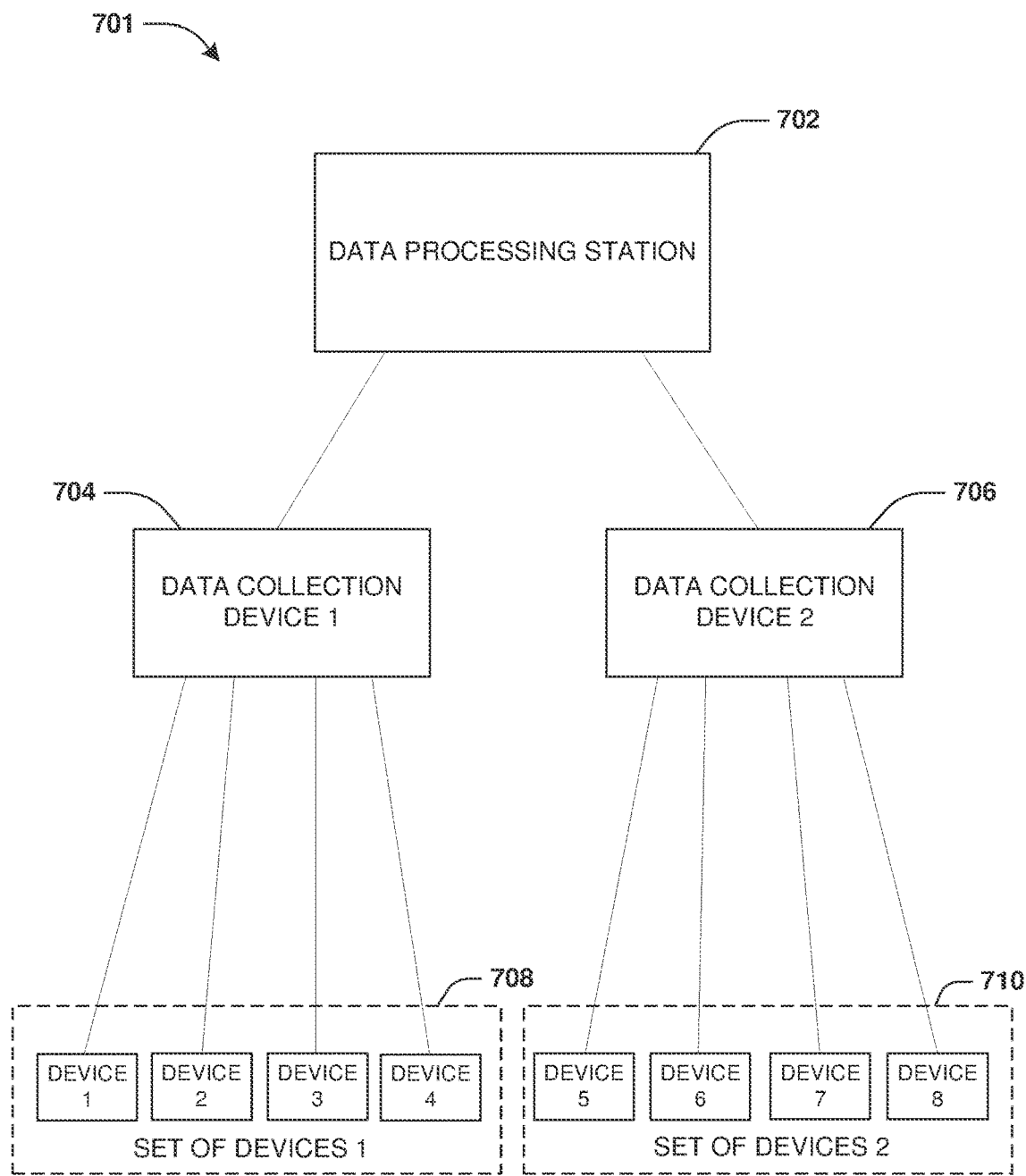
FIG. 7 is a component block diagram illustrating an example system for transmitting messages to a first data collection device, a second data collection device and/or a data processing station.

FIG. 7 illustrates an example of a system 701 for transmitting messages to a first data collection device 704, a second data collection device 706 and/or a data processing station 702. In some examples, a plurality of devices (e.g., of a building) may be configured to receive data packets from a second plurality of devices. The second plurality of devices may comprise beacons and/or may transmit the data packets using a Bluetooth system and/or a Bluetooth Low Energy system. In some examples, the plurality of devices may comprise room sensors and/or dispense device sensors. Accordingly, the plurality of devices may transmit the messages (e.g., generated based upon the data packets) using the Bluetooth system and/or the Bluetooth Low Energy system.

In some examples, a first set of devices 708, of the plurality of devices, may be assigned to the first data collection device 704. The first set of devices 708 may be configured to transmit a first set of messages (e.g., generated based upon a first set of data packets) (e.g., directly) to the first data collection device 704. Alternatively and/or additionally, the first set of devices 708 may be configured to transmit one or more messages (e.g., of the first set of messages) to the first data collection device 704 by (e.g., first) relaying the one or more messages across (e.g., and/or through) one or more devices of the first set of devices 708 and (e.g., then) transmitting the one or more messages to the first data collection device 704 using a device of the first set of devices 708. For example, each device of the first set of devices 708 may comprise a repeater device and/or may be coupled to a repeater device. A first device of the first set of devices 708 may transmit a first message to a second device of the first set of devices 708. The second device may relay (e.g., receive and/or transmit) the first message (e.g., using a repeater device of the second device) to the first data collection device 704 and/or to a third device of the first set of devices 708. The first message may be relayed across devices of the first set of devices 708 and/or (e.g., other) devices (e.g., of other sets of devices) until the first message is transmitted to the first data collection device 704.

A second set of devices 710 of the plurality of devices may be assigned to the second data collection device 706. The second set of devices 719 may be configured to transmit a second set of messages (e.g., generated based upon a second set of data packets) (e.g., directly) to the second data collection device 706. Alternatively and/or additionally, the second set of devices 710 may be configured to transmit one or more messages (e.g., of the second set of messages) to the second data collection device 708 by (e.g., first) relaying the one or more messages across one or more devices of the second set of devices 710 and (e.g., then) transmitting the one or more messages to the second data collection device 706 using a device of the second set of devices 710 (e.g., using repeater devices associated with the second set of devices 710).

In some examples, the first data collection device 704 may be configured to transmit the first set of messages to the data processing station 702. Alternatively and/or additionally, the second data collection device 706 may be configured to transmit the second set of messages to the data processing station 702.

It may be appreciated that the disclosed subject matter may assist in determining compliance with a protocol by an entity and/or in determining a current location and/or a previous location of the entity.

Implementation of at least some of the disclosed subject matter may lead to benefits including, but not limited to, an increase in accuracy and/or precision of the determining the compliance with the protocol (e.g., as a result of a device of a badge assigned to the entity comprising a counter configured to increment a counter value associated with a time of transmission of a data packet, as a result of transmitting a plurality of data packets wherein each data packet of the plurality of data packets may comprise a counter value, as a result of determining a time-length of an action based upon an evaluation of a first counter value and a second counter value, as a result of determining the compliance with the protocol based upon the time-length of the action, as a result of implementing an LBT system to ensure reception of data packets and/or messages, as a result of transmitting data packets and/or messages periodically to ensure reception of the data packets and/or the messages, as a result of using repeater devices to relay information across devices to the data collection device and/or the data processing station, etc.).

Alternatively and/or additionally, implementation of at least some of the disclosed subject matter may lead to benefits including a reduction in (e.g., wireless) interference between (e.g., transmissions of) devices (e.g., as a result of transmitting the plurality of data packets using a first channel of a wireless system at a first time-rate and/or a first power level wherein the first time-rate and/or the first power level are configured such that one or more unrelated devices do not receive and/or retain data packets of the plurality of data packets, as a result of a first device receiving data packets of the plurality of data packets using the first channel, as a result of transmitting the plurality of data packets using a second channel of the wireless system at a second time-rate and/or a second power level wherein the second channel is different than the first channel and/or the second time-rate and/or the second power level are configured such that one or more unrelated devices do not receive and/or retain data packets of the plurality of data packets, as a result of a second device receiving a data packet of the plurality of data packets using the second channel, as a result of transmitting messages to the data collection device and/or the data processing station using a third channel of the wireless system wherein the third channel is different than the first channel and the second channel, etc.).

Alternatively and/or additionally, implementation of at least some of the disclosed subject matter may lead to benefits including a reduction in power usage (e.g., as a result of deactivating the device of the badge responsive to sensing the device is not moving, as a result of deactivating the device of the badge responsive to sensing that the device and/or the badge are not attached to the entity, as a result of switching the first device between operating in a low power state and an operational state, as a result of the first device operating in the low power state until switching to the operational state responsive to detection one or more entities entering the room, one or more entities in the room and/or one or more entities leaving the room, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 8:
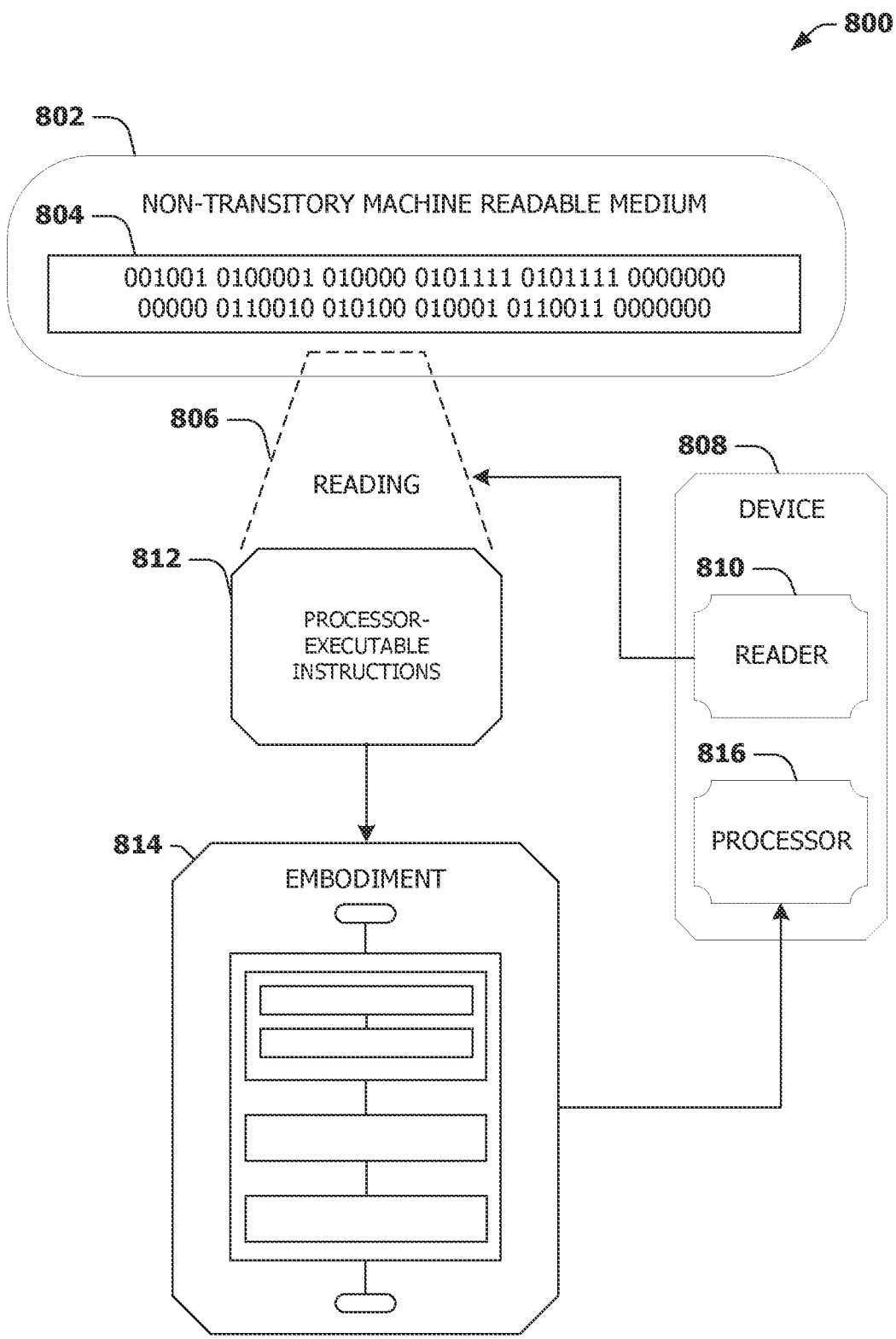
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814).

The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk).

The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812.

In some embodiments, the processor-executable instructions 812, when executed, cause performance of operations, such as at least some of the example method 400 of FIG. 4, for example. In some embodiments, the processor-executable instructions 812 are configured to cause implementation of a system, such as at least some of the example system 501 of FIGS. 5A-5B, the example system 601 of FIG. 6 and/or the example system 701 of FIG. 7, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
a beacon configured to transmit a plurality of data packets based upon one or more time-rates, wherein each data packet of the plurality of data packets is transmitted by the beacon at a time-rate corresponding to a frequency associated with a recipient of the data packet and comprise an identification number associated with the beacon and a counter value associated with a time of transmission of the data packet such that the same beacon transmits multiple data packets at different power levels and different time-rates corresponding to different frequencies associated with reception by different devices, the transmitting the plurality of data packets comprising:
transmitting, by the beacon at a first time and at a first time-rate corresponding a first frequency, a first data packet comprising the identification number associated with the beacon and a first counter value associated with the first time, the first time-rate corresponding the first frequency configured to enable reception of the first data packet by a first device; and
transmitting, by the same beacon that transmitted the first data packet and at a second time and at a second time-rate corresponding a second frequency different than the first frequency, a second data packet comprising the identification number associated with the beacon and a second counter value associated with the second time, the second time-rate corresponding the second frequency configured to enable reception of the second data packet by a second device different than the first device.

2. The system of claim 1,
the first data packet transmitted at a first power level; and
the second data packet transmitted at a second power level, the second power level different than the first power level.

3. The system of claim 2,
the first power level configured to prevent reception of the first data packet by one or more other devices different than the first device.

4. The system of claim 2,
the second power level configured to mitigate interference between beacons.

5. The system of claim 2,
the second power level configured to enable reception of the second data packet by the second device.

6. The system of claim 2,
the second power level lower than the first power level.

7. The system of claim 1, comprising:
a badge comprising the beacon, the badge assigned to an entity and configured to assist in tracking actions associated with the entity.

8. The system of claim 1,
the beacon configured to transmit the plurality of data packets using one or more first channels of a wireless system.

9. The system of claim 1,
the first device comprising a room sensor; and
the second device comprising a dispense device.

10. The system of claim 1, comprising:
a counter, connected to the beacon, configured to increment the counter value based upon a time interval between increments associated with the counter.

11. A method, comprising:
receiving, from a mobile beacon in a building, a first data packet, of a plurality of data packets and associated with a first event, comprising a first counter value, wherein the first data packet is received by a stationary device in the building, wherein the first data packet was transmitted by the mobile beacon to the stationary device at a different power level and a different time-rate than another data packet transmitted by the mobile beacon to a different device;
receiving, from the mobile beacon in the building, a second data packet, of the plurality of data packets, comprising a second counter value, wherein the second data packet is received by the stationary device in the building; and
based upon (i) a determination to retain the first data packet received by the stationary device in the building from the mobile beacon in the building responsive to determining that the first data packet has a first signal strength, corresponding to the mobile beacon being located at a first location in the building that is a first distance away from the stationary device, exceeding a first signal strength threshold and (ii) a determination to discard the second data packet received by the stationary device in the building from the mobile beacon in the building responsive to determining that the second data packet has a second signal strength, corresponding to the mobile beacon being located at a second location in the building that is a second distance away from the stationary device, less than a second signal strength threshold, generating a time-length of an action based upon an evaluation of the first counter value of the retained first data packet having the first signal strength exceeding the first signal strength threshold but not the second counter value of the discarded second data packet having the second signal strength less than the second signal strength threshold, wherein the second distance is greater than the first distance.

12. The method of claim 11, comprising:
determining compliance with a protocol by comparing the time-length of the action with a time-limit associated with the protocol.

13. A method, comprising:
receiving, by a first stationary device in a building, a first data packet comprising a first counter value from a mobile beacon in the building, wherein the mobile beacon is configured to transmit a plurality of data packets based upon a time-rate, wherein each data packet of the plurality of data packets comprise an identification number associated with the mobile beacon and a counter value associated with a time of transmission of the data packet, wherein the first data packet was transmitted by the mobile beacon to the first stationary device at a different power level and a different time-rate than another data packet transmitted by the mobile beacon to a different device;
generating, using the first stationary device, a first message based upon the first counter value;
transmitting, using the first stationary device, the first message to a data processing station;
receiving, by at least one of the first stationary device in the building or a second stationary device in the building, a second data packet comprising a second counter value from the mobile beacon;
determining, using the data processing station, a first event associated with the first data packet based upon the first message;
determining, using the data processing station, a first time associated with the first event based upon the first counter value; and
based upon (i) a determination to retain the first data packet received by the first stationary device in the building from the mobile beacon in the building responsive to determining that the first data packet has a first signal strength, corresponding to the mobile beacon being located at a first location in the building, exceeding a first signal strength threshold and (ii) a determination that to discard the second data packet received by at least one of the first stationary device in the building or the second stationary device in the building from the mobile beacon in the building responsive to determining the second data packet has a second signal strength, corresponding to the mobile beacon being located at a second location in the building, less than a second signal strength threshold, generating, using the data processing station, a time-length of an action based upon an evaluation of the first time associated with the retained first data packet having the first signal strength exceeding the first signal strength threshold but not a second time associated with the discarded second data packet having the second signal strength less than the second signal strength threshold, wherein the second location is different than the first location.

14. The method of claim 13, comprising:
determining, using the data processing station, compliance with a protocol by comparing the time-length of the action with a time-limit associated with the protocol.

15. The method of claim 14, comprising:
generating a report based upon the time-length of the action and the compliance with the protocol.

16. The method of claim 13,
the mobile beacon comprised within a badge that is assigned to an entity and is configured to assist in tracking actions associated with the entity.

17. The method of claim 14,
the first stationary device configured to detect one or more entities in a room; and
the first event comprising the entity entering the room.

18. The method of claim 13,
the mobile beacon configured to transmit the plurality of data packets using one or more first channels of a wireless system;
the receiving the first data packet by the first stationary device performed using the one or more first channels; and
the transmitting the first message to the data processing station performed using one or more second channels of the wireless system.

19. The method of claim 18,
the receiving the second data packet performed using the one or more first channels.

20. The method of claim 18,
the wireless system comprising a Bluetooth Low Energy system.

* * * * *